(12) United States Patent
Cerea

(10) Patent No.: US 6,757,987 B2
(45) Date of Patent: Jul. 6, 2004

(54) METHOD FOR PRODUCING POWDER PAINTS

(75) Inventor: Giuseppina Cerea, Trezzano sul Naviglio (IT)

(73) Assignee: Vomm Chemipharma S.r.l., Milan (IT)

( * ) Notice: Subject to any disclaimer, the term of this patent is extended or adjusted under 35 U.S.C. 154(b) by 104 days.

(21) Appl. No.: 10/084,885

(22) Filed: Mar. 1, 2002

(65) Prior Publication Data

US 2002/0162242 A1 Nov. 7, 2002

(30) Foreign Application Priority Data

Mar. 2, 2001 (IT) ..................... MI2001A0441

(51) Int. Cl.⁷ .............................. F26B 5/08
(52) U.S. Cl. ..................... 34/321; 34/315; 34/386
(58) Field of Search ................ 34/312, 386, 313, 34/315, 318, 321

(56) References Cited

U.S. PATENT DOCUMENTS 4,013,615 A * 3/1977 Ohashi et al. .............. 523/205
5,100,510 A * 3/1992 Bianchi et al. ............... 159/6.3
5,296,523 A * 3/1994 Kobayashi et al. .......... 523/200
5,695,281 A * 12/1997 Weber et al. ................ 366/235
5,972,425 A * 10/1999 Nishi et al. .................. 427/195

FOREIGN PATENT DOCUMENTS

GB        2 325 235 A      11/1998
WO    WO 95 284 34 A      10/1995

* cited by examiner

Primary Examiner—Ira S. Lazarus
Assistant Examiner—Kathryn S. O'Malley
(74) Attorney, Agent, or Firm—Sughrue Mion, PLLC

(57) ABSTRACT

A method for producing powder paints which comprises the steps of:
a) preparing a paste comprising at least one thermosetting plastic resin, at least one curing agent, at least one pigment and water and making the paste flow in the form of a thin layer and under conditions of high turbulence in contact with a wall at a predetermined temperature; b) drying the paste by making it flow into a thin and turbulent layer in contact with a heated wall and optionally with a flow of heated gas.

8 Claims, 1 Drawing Sheet

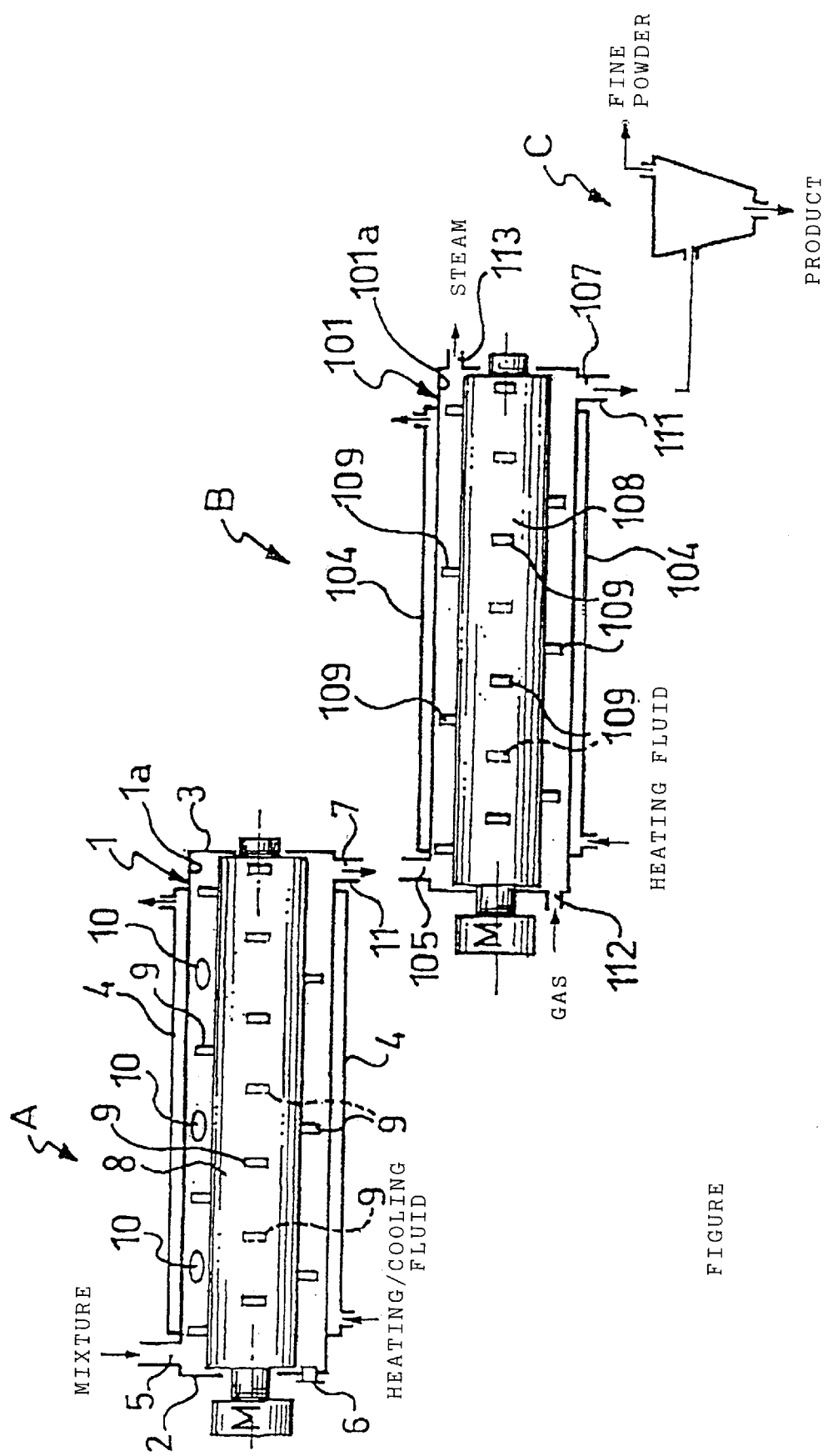
FIGURE

METHOD FOR PRODUCING POWDER PAINTS

DESCRIPTION

1. Field of Application

In its more general aspect the present invention refers to the coating industry sector.

In particular, the invention regards a method for producing powder paints.

2. Prior Art

The use of powder paints began at the start of the 60's in the United States, applied to the coating of metal objects and then underwent a substantial impulse from the moment when in 1966 the first electrostatic plant for applying powders was made operative in Germany.

From then on coating with electrostatically applied powders has won an ever greater market share in the sector of surface protection, in virtue of the substantial advantages, which it gives with respect to traditional application methods which use solvents.

Amongst the most significant advantages one can recall:

the elimination of risks of fire, of air pollution and of toxicity connected with the presence of solvents;

the lower porosity of the obtained set coatings;

the obtainment of high thickness in a single coating operation;

the negligible material losses;

the excellent chemical strength of the obtained coatings;

the absence of powder inside the obtained films;

the ease with which the application equipment is cleaned;

the saving in manpower;

The formulations for powder paints generally include the following components: a resin, a curing agent, a flow control agent, pigments and fillers.

Amongst resins, the most widely used are epoxy resins but polyester, polyurethane and polyacrylic resins are also used, as well as mixed polyester-epoxy systems.

The aforementioned formulations are produced fundamentally according to two procedures.

A first procedure foresees the mixing of all of the formulations inside a mixer (for example a zed mixer). Firstly the resin is melted (at about 130–150° C.) and then the flow control agent is added; finally the pigments and the fillers are added and the temperature is allowed to drop down to 90–110° C., before adding the curing agent. After about 15 minutes, the mass is discharged onto a flat surface and cooled, to then be subjected to milling, for example in a hammer mill. The powder thus obtained is sieved and the particles which are too big are put back through the mill.

When this procedure is used, the choice of curing agent is limited to those agents which are inactive at the temperatures which are reached inside the mixer, like for example dicyandiamide and boron trifluoride complexes.

The second procedure for preparing powder paints, on the other hand, foresees an initial mixing of the ingredients, which must all be powdered. The uniform mixture thus obtained is fed inside an extruder, the chamber of which has been preheated to 70–90° C. The melted mass leaving the extruder is gathered under the form of pieces about 12 mm thick and then is pulverized and sifted.

In this case more reactive curing agents can also be used, since the permanence of the resin/curing agent mixture in melted state in the extrusion chamber is very short.

Nevertheless, since the extrusion must be preceded by a mixing, the curing agent must be a powder and not a liquid.

As has been seen, both of the procedures referred to above have limitations in the choice of curing agents and, moreover, are characterized by a somewhat low hourly productivity, as a consequence of the low yields of the extrusion and milling apparatuses.

SUMMARY OF THE INVENTION

The problem underlying the present invention is that of providing a method for producing powder paints which allow the range of curing agents which can be used to be widened and above all to increase productivity.

Such a problem has been solved, according to the invention, by a method for producing powder paints, which comprises the steps of:

a) preparing a paste comprising at least one thermosetting plastic resin, at least one curing agent, at least one pigment and water and making said paste flow in the form of a thin layer and under conditions of high turbulence in contact with a wall at a predetermined temperature;

b) drying said paste by making it flow into a thin and turbulent layer in contact with a heated wall and optionally with a flow of heated gas.

The temperature of the heated wall is generally between 50° C. and 100° C. and the temperature of the heated gas is generally between 80° C. and 160° C. Preferably the gas consists of air.

To carry out the method according to the invention an apparatus known as a turbomixer is advantageously used. In such a case the method according to the present invention comprises the steps of:

providing a turbomixer comprising a cylindrical tubular body, equipped with an optional jacket for heating/cooling its inner wall, with at least one inlet opening for a flow of a mixture comprising at least one thermosetting plastic resin, at least one curing agent and at least one pigment, with at least one inlet opening for a flow of water, at least one discharge opening and a bladed rotor, rotatably supported in the cylindrical body and having the blades arranged helically;

continuously feeding a flow of said mixture and a flow of water in cocurrent into the turbomixer;

centrifuging said flows by means of said bladed rotor against the inner wall of said turbomixer, with the formation of a paste arranged in a turbulent and dynamic thin tubular layer which is made to advance by the blades of said rotor towards said at least one discharge opening, said blades subjecting the paste of said turbulent and dynamic thin tubular layer to intense mechanical work;

continuously discharging a flow of said paste from said at least one discharge opening; and drying said paste obtaining said powder paint.

In the procedure according to the invention, the bladed rotor of said turbomixer is rotated at a speed of at least 600 rpm, advantageously 800–1200 rpm.

In the turbomixer, the aforementioned at least one inlet opening for the flow of water can consist of a feeding mouth or of distributor nozzles or of both.

Preferably, the paste leaving the turbomixer contains an amount of water equal to about 10–40%, advantageously about 20%, of its total weight.

Conveniently, the drying step can be carried out in a turbodryer structurally analogous to the previous turbomixer from which it differs for a few characteristics, described hereafter, to be able to carry out the drier function.

The turbodryer comprises a cylindrical tubular body equipped with a jacket for heating its inner wall, with at least one inlet opening for said paste, with at least one discharge opening for the powder paint, at least one outlet opening for the steam released from the drying and with a bladed rotor, rotatably supported in the cylindrical body, with blades oriented so as to make said paste advance from said at least one inlet opening to said at least one discharge opening.

A fan is connected to the turbodryer to suck out the steam which is released during drying.

The turbodryer can also comprise at least one inlet opening for a gas, preferably air.

In accordance with such an embodiment, the drying of the procedure of the invention comprises the steps of:

continuously feeding a flow of the paste coming out of the aforementioned turbomixer into the aforementioned turbodryer, in which the inner wall is kept at a temperature of 50–100° C. and in which the bladed rotor is rotated at a speed of at least 600 rpm;

centrifuging the aforementioned paste in the turbodryer with the formation right from its entry into the turbodryer of a turbulent and dynamic tubular thin layer which is made to advance by the blades of the rotor of the turbodryer towards said at least one opening for discharging it, in a heat exchange relationship with the inner wall of the turbodryer, said blades subjecting the turbulent and dynamic thin tubular layer of paste to intense mechanical work;

simultaneously sucking out the steam which is released from said paste, and continuously discharging a flow of a powder paint.

In accordance with a feature of the drying step of the procedure of the invention, a flow of gas, preferably air at a temperature of 80–160° C., is fed into the turbodryer at the same time as and in cocurrent to the flow of said paste to be dried.

According to an alternative embodiment of the method according to the invention, the mixing and drying steps can be carried out inside a single apparatus of the type illustrated above.

In such a case the turbomixer shall be equipped, in correspondence with a first end wall, with at least one inlet opening for the aforementioned flow of mixture and with at least one inlet opening for the flow of water, and, at a predetermined distance along its longitudinal axis, with at least one inlet opening for a flow of heated gas, as well as with at least one discharge opening for the final powder paint and with at least one discharge opening for the steam, at a second opposite end wall. The turbomixer shall conveniently be equipped with two jackets, the first extending from said end wall up to said inlet opening for the flow of heated gas, and the second extending from such a point to said second opposite end wall.

According to another feature, the process of the invention can further comprise a step of removing the fine powders from the final product to be carried out in a powder separator, for example a cyclone. Moreover, a sleeve filter can be foreseen to retain the finest particles which are not retained by the cyclone.

The powder paint obtained with the process according to the invention always has a relative humidity of less than 4% and generally less than or equal to 1%. The particles of which it consists are spheroidal granules of a size generally equal to or less than 100 µm.

If one should wish to guarantee as far as possible that the particles have the aforementioned size, the method according to the invention can include the further step of subjecting the flow of paste coming out from the turbomixer to a continuous refining through a paste refiner, for example a roll refiner, before moving on to the drying step.

Alternatively, the powder paint coming out from the turbodryer can be subjected to sieving with conventional apparatus, in order to remove possible particles of a size greater than 100 µm.

The thermosetting plastic resin which can be used in the present method can be chosen from those commonly used in the production of powder paints. In particular the resin can be an epoxy, polyester, polyurethane, polyacrylic or polyester-epoxy resin.

Suitable polyester resins can be obtained by polymerization-condensation reaction between a polybasic saturated acid or an anhydride thereof and a polyalcohol. Amongst the dibasic acids and the dicarboxylic anhydrides which are suitable for such a purpose one can name phthalic acid, phthalic anhydride, pyromellitic anhydride, succinic acid and adipic acid. Examples of suitable polyalcohols consist of ethylene glycol, triethylene glycol, propylene glycol, dipropylene glycol, glycerol, trimethylol propane, pentaerythritol, neopentyl glycol and hydrogenated bisphenol-A As commercial polyester resins we quote as an example McWhorter 30-3000® of the company McWhorter Technologies Inc. and Alftalac N-745® of Vianova Resins.

Amongst the epoxy resins which can be used in the procedure according to the invention, one can name epoxy resins of the bisphenol-A type, novolac epoxy resins and alicyclic epoxy resins.

As acrylic resins one can use those obtained by copolymerization of functional monomers like acrylic acid and various copolymerisable monomers. Amongst these copolymerisable monomers one can recall unsaturated olefinic monomers, such as ethylene, propylene and isobutylene, aromatic monomers such as styrene, vinyltoluene and alpha-methyl styrene, esters of acrylic and methacrylic acid with alcohols having from 1 to 18 carbon atoms, such as methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, cyclohexyl acrylate, cyclohexyl methacrylate, lauryl acrylate, lauryl methacrylate, vinyl esters of carboxylic acids having 2 to 11 carbon atoms, such as vinyl acetate, vinyl propionate and vinyl-2-ethylhexylacrylate and other co-monomers such as vinyl chloride, acrylonitrile and methacrylonitrile.

Polyurethane resins suitable for the purpose of the present method are blocked urethane polymers obtained by polycondensation of isocyanates with various polyols.

As stated previously, the process according to the invention allows the use, as well as of solid curing agents with a low reactivity which are used in methods for preparing powder paints known up to now, also of other curing agents the use of which was up to now not possible due to the high temperatures reached in the melting or extrusion steps of known methods.

Therefore, curing agents which are currently used in the production of powder paints, such as dicyandiamide and derivatives thereof, anhydrides such as pyromellitic, trimellitic, phthalic, tetrahydrophthalic, hexahydrophthalic, methylhexahydrophthalic, succinic, hexahydrophthalic and maleic anhydrides, aromatic diamines such as paraphenylenediamine, metaphenylenediamine, 4,4'-diaminodiphenylmethane, 4,4'-diaminodiphenylsulfone, 4,4'-diaminodiphenyl ether, imidazole, dihydrazide, cyclic amidines and boron trifluoride complexes can be used.

However, in addition, liquid and highly reactive curing agents, such as ethanolamines and propanolamines, and in particular monoethanolamine, diethanolamine, triethanolamine, monoisopropanolamine, diisopropanolamine, triisopropanolamine, as well as aliphatic diamines, such as trimethyl hexamethylene diamine, the curing agent Hardener V 214® (Hüls), isophorone diamine, methylated melamine-formaldehyde water soluble resins with a high solid content, such as Resmelin 7W87® can also be used.

All of the pigments currently used in formulations of powder paint are suitable for being used in the method according to the present invention.

The flow agents which can optionally be used in the preparation of powder paints according to the method of the present invention are those currently used in the industrial production of powder paints. To name just those most commonly used, there is silica (Aerosil®), alumina, butyl acrylate homopolymers, 2-ethylhexyl acrylate copolymers and polyvinyl butyrals. In addition, the alkanolamines, mentioned above as curing agents, can be used as flow agents. In such a case the "gloss" of the final paint is kept to the maximum degree, which on the other hand is decreased by the addition of typical solid flow agents, such as silica gel.

Other flow agents which can be used in the method according to the present invention are polyalkylene glycols, in particular polyethylene glycols and polypropylene glycols.

Some of the advantages of the method according to the present invention have already been highlighted previously, in particular the substantial widening of the range of curing agents which can be used.

It is worth recalling others, which are not of lesser importance. For example the low energy consumption which the method brings with respect to the techniques used up to now, which always foresee a dry milling step, notoriously characterized by a low yield.

The possibility offered by the present method of working continuously, which implies a somewhat greater hourly productivity to that of known methods, is important.

The method according to the present invention allows the size of the particles of the final powder paint to be controlled easily and with precision, said particles being spheroidal in shape, whereas the particles of powder paint known up to now were flake-like.

The spheroidal shape of the particles allows, at the time when the paint is applied, a uniform coating of the surface to be painted to be obtained with smaller thicknesses than the normal ones. The film obtained has excellent aesthetic characteristics in terms of brightness, still thanks to the spheroidal shape of the particles.

DETAILED DESCRIPTION OF THE INVENTION

The advantages and the characteristics of this invention shall become clearer from the following description of an embodiment of a method for the production of powder paints, given hereafter with reference to the attached drawing, given for indicating and not limiting purposes and in which an apparatus for carrying out such a method is represented schematically.

With reference to the aforementioned figure, an apparatus used for carrying out the method of the invention essentially comprises a turbomixer A, a turbodryer B and a cyclone C.

The aforementioned turbomixer and turbodryer possess many common structural elements for which reason only the turbomixer shall be described in detail.

In the aforementioned figure the structural elements of the turbodryer B corresponding to the respective elements of the turbomixer A have been given the same reference numerals as such elements of the turbomixer increased by 100.

The turbomixer A comprises a cylindrical tubular body 1, arranged with its longitudinal axis horizontal and closed at the opposite ends by end walls 2, 3 coaxially equipped with a heating/cooling jacket 4, intended to be run through by a diathermic fluid or another fluid, to keep the inner wall 1a of said body 1 at a predetermined temperature.

The tubular body 1 is equipped with an inlet opening 5 for a mixture comprising at least one curing agent and at least one pigment, and with a discharge opening 7 for the paste comprising such components and water. This discharge opening 7 is in communication through a duct 11 with the inlet opening 105 of the turbodryer B which receives the flow of the aforementioned paste.

In the tubular body 1 a bladed rotor 8 is supported for rotation, the blades 9 of which are arranged helically and are oriented so as to simultaneously centrifuge and convey said paste towards the discharge opening 7.

A motor M is foreseen for driving the rotor 8 at a speed of between 600 and 1200 rpm.

The tubular body 1 comprises, moreover, an opening 6 and a series of nozzles 10 for feeding a flow of water inside said tubular body 1.

The various components of the aforementioned mixture are conveniently premixed before their introduction into the turbomixer through the aforementioned inlet opening 5 but can also be introduced as separate flows through suitable dispensers, which feed them through the same inlet opening 5 or optionally also through many inlet openings situated near to the end wall 2.

This possibility is particularly useful when it is foreseen to use a liquid curing agent.

To guarantee good operation and constancy of production, turbomixers made by the Applicant itself were particularly reliable.

According to the method of the invention, a flow of a mixture comprising at least one curing agent and at least one pigment is fed continuously into the turbomixer A, through the inlet opening 5 and, from the moment it enters such an inlet, it is taken and mechanically worked by the blades 9 of the rotor 8, kept at an appropriate rotation speed.

At the same time, from the opening 6 and from the nozzles 10 a continuous flow of water is fed inside the tubular body.

Then, the blades 9 of the rotor 8 centrifuge the paste deriving from the mixing of the aforementioned components with the water against the inner wall 1a of the turbomixer, thus forming a thin tubular layer in the turbomixer A. Said thin tubular layer is turbulent and dynamic since it is driven by the blades 9 of the rotor 8 towards the discharge opening 7.

While said turbulent and dynamic thin tubular layer flows in contact with the wall 1a of the turbomixer, the paste which it is made up of is continuously mechanically worked by the blades 9 of the rotor 8, which keep it in an extreme and homogeneous mixed state, simultaneously performing a sort of wet milling of the larger particles, in particular those of the resin, which is often in the form of flakes.

The flow of said paste coming out of the discharge opening 7 of the turbomixer A passes inside the turbodryer B through the inlet opening 105.

At the same time and in cocurrent to the flow of the paste, a continuous flow of air at a temperature of 80–160° C. and with a flow rate of 400–700 $m^3/h$ is also fed through the inlet opening 112.

Next, the blades 109 of the rotor 108 centrifuge the paste coming from the turbomixer A against the inner wall kept at a predetermined temperature (50–100° C.) by a diathermic fluid or another fluid which flows through the jacket 104 for heating the turbodryer B, thus forming, from the moment the paste enters into the turbodryer, a turbulent and dynamic thin tubular layer which is driven by the blades 109 of the rotor 108 towards the discharge opening 107.

While said turbulent and dynamic thin tubular layer flows in contact with the wall 101a of the turbodryer B, in a heat exchange relationship with it, the paste of which it consists is continuously mechanically worked by the blades 109 of the rotor 108, which take care of keeping it in an extreme and homogeneous mixed state.

In such a way, at the exit from the turbodryer B, a flow of spheroidical particles is obtained which for the most part have an average diameter less than or equal to 100 μm and which constitute the desired powder paint.

The steam which is released by effect of the drying of the paste is sucked out by a fan (not shown) connected to the turbodryer B and leaves said turbodryer through the opening 113 of the cylindrical tubular body 101.

Then, the finished product is discharged from the turbodryer B through the discharge opening 107 and is sent through a duct 111 into the cyclone C to separate the fine powder from the finished product. Such fine powder is in turn captured through a non-represented sleeve filter.

In the method according to the invention the temperature of the wall 1a of the turbomixer A and of the inner wall 101a of the turbodryer B are chosen according to the chemical-physical properties of the resin used and to the reactivity of the curing agent used. In particular, the temperature can be higher the higher the melting point of the resin and the lower the chemical reactivity of the curing agent.

Obviously, for technical and contingent reasons the turbomixer and the turbodryer described above can be equipped with one or more inlet and discharge openings and with one or more respective heating and cooling jackets to, for example, create a temperature gradient and thus carry out a heat exchange according to particular working requirements.

EXAMPLE 1

Preparation of a Powder Paint Based Upon an Epoxy Resin

By using the apparatus previously described and by following the method according to the invention, a mixture of solid components is continuously fed into the turbomixer A, with a flow rate of 50 kg/hour, consisting of (parts by weight):

| | |
|---|---|
| "Epikote" ® 1004 resin | 100 |
| Aerosil ® 2491/380 | 1 |
| Butvar ® D 510 | 4 |
| $TiO_2$ | 30 |
| Dicyandiamide | 4.4 |

Epikote 1004® resin is an epoxy resin obtained from bisphenol A and epichlorohydrin with an equivalent weight >700 (CAS-NR 25068-38-6); Aerosil®2491/380 is a finely subdivided silica gel and is used as an anti-run agent; Butvar®D 510 is a polyvinyl butyral used as a flow agent; titanium dioxide constitutes the pigment and dicyandiamide is the curing agent.

The temperature of the wall of the turbomixer was controlled around 40° C., whereas the speed of the bladed rotor was constantly kept at 1000 rpm.

At the same time a flow of water was fed inside the turbomixer A by means of the nozzles 10 and the opening 6 with a flow rate of 10 l/hour.

After a residence time inside the turbomixer A of about 1 minute, the paste which had formed in such a turbomixer was continuously fed into the turbodryer B, in which the temperature of the wall was controlled around the value of 80° C. and the speed of the rotor was kept at the speed of 1000 rpm.

A continuous flow of air was also fed into the turbodryer B, in cocurrent to the flow of the paste, with a flow rate of 600 m³/h and at a temperature of 100° C. and the steam generated by effect of the drying was sucked out together with the air by means of a fan connected to the turbodryer B.

After a residence time in the turbodryer B of about 4 minutes a powder paint is discharged, consisting of spheroidal particles with a high flowability. The flow of powder paint was sent to the cyclone C for the separation of the fine powder and the final powder paint was collected downstream of the cyclone. The powder paint had a humidity content of about 0.9% and more than 90% of its particles had an average diameter of less than 100 μm.

EXAMPLE 2

Preparation of a Powder Paint Based Upon Polyester Resin

By using the apparatus previously described and by following the method according to the invention, the following mixture was continuously fed into the turbomixer A, with a flow rate of 50 kg/hour, (parts by weight):

| | |
|---|---|
| Polyester EP 812 | 30 |
| $TiO_2$ RN59 | 30 |
| Maprenal NS900 | 7 |
| Methylbenzoate | 3.5 |

Polyester EP 812 is a saturated linear polyester commercialized by Dynamite Nobel; $TiO_2$ RN59 is a titanium dioxide commercialized by Kronos Titan; Maprenal NS 900 is a melamine resin produced by Hoechst.

The temperature of the wall of the turbomixer was controlled around 40° C., whereas the speed of the bladed rotor was constantly kept at 1200 rpm. At the same time, a flow of water was fed inside the turbomixer A by means of the nozzles 10 and the opening 6 with a flow rate of 15 l/hour.

After a residence time in the turbomixer A of about 1 minute, the paste which had formed in it was continuously fed to a three-roll refiner and the refined paste coming out of such an apparatus was continuously fed into the turbodryer B, in which the temperature of the wall was controlled around the value of 50° C. and the speed of the rotor was kept at 1000 rpm.

A continuous flow of air was also fed into the turbodryer B, in cocurrent to said refined paste, with a flow rate of 600 m³/h and at a temperature of 85° C. and the steam generated by effect of the drying was sucked out together with the air through a fan connected to the turbodryer B.

After a residence time in the turbodryer B of about 5 minutes a powder paint is discharged, which is sent to the cyclone C to be separated from the fine powder.

The aforementioned paint consisted of spheroidal particles all having an average diameter of less than 100 μm and a humidity content of about 0.9%.

What is claimed is:

1. A method for producing powder paints comprising the steps of:
   a) providing a turbomixer (A) comprising a cylindrical tubular body (1), equipped with an optional jacket (4) for heating/cooling its inner wall (1a), with at least one inlet opening (5) for a flow of a mixture comprising at least one thermosetting plastic resin, at least one curing agent and at least one pigment, with at least one inlet opening (6, 10) for a flow of water, with at least one discharge opening (7) and with a bladed rotor (8), rotatably supported in the cylindrical body (1) and having its blades (9) arranged helically;
   b) continuously feeding a flow of said mixture and a flow of water in cocurrent into the turbomixer (A);
   c) centrifuging said flows by means of said bladed rotor (8) against the inner wall of said turbomixer (A), with the formation of a paste arranged in a turbulent and dynamic tubular thin layer which is made to advance by the blades (9) of said rotor (8) towards said at least one discharge opening (7), said blades (9) subjecting said turbulent and dynamic thin tubular layer of paste to intense mechanical work;
   d) continuously discharging a flow of said paste from said at least one discharge opening (7); and
   e) drying said paste obtaining said powder paint.

2. A method according to claim 1, wherein said bladed rotor (8) is rotated at at least 600 rpm.

3. A method according to claim 2, wherein said paste coming from step d) is subjected to refining through a refiner before being subjected to said drying step e).

4. A method according to claim 1, wherein said drying step (e) of the paste in turn comprises the steps of:

a) providing a turbodryer (B) comprising a cylindrical tubular body (101), equipped with a jacket (104) for heating its inner wall (101a), with at least one inlet opening (105) for a flow of said paste, with at least one inlet opening (112) for a flow of gas, with at least one discharge opening (107, 113) and with a bladed rotor (108), rotatably supported in the cylindrical body (101) and having its blades (109) arranged helically;
   b) continuously feeding a flow of the paste coming out of said turbomixer (A) into said turbodryer (B), in which the inner wall (101a) is kept at a temperature of 50–100° C. and in which the bladed rotor (108) is rotated at a speed of at least 600 rpm;
   c) centrifuging said paste in said turbodryer (B) with the formation right from its entry into the turbodryer (B) of a turbulent and dynamic tubular thin layer which is made to advance by the blades (109) of the rotor (108) of said turbodryer (B) towards said at least one opening (107) for discharging it, in a heat exchange relationship with the inner wall (101a) of said turbodryer (B), said blades (109) subjecting the turbulent and dynamic thin tubular layer of paste to intense mechanical work;
   d) simultaneously sucking out the steam which is released from said paste, and continuously discharging a flow of a powder paint.

5. A method according to claim 4, wherein a flow of a gas at a temperature of 80–160° C. is fed into the turbodryer (B) through said inlet opening (112) at the same time as and in cocurrent to the flow of said paste to be dried.

6. A method according to claim 5, wherein said gas is air.

7. A method according to claim 1, wherein said paste contains 10 to 40% water by weight.

8. A method according to claim 4, wherein said paste contains 10 to 40% water by weight.

* * * * *